US011455027B2

(12) United States Patent
Wagner (10) Patent No.: US 11,455,027 B2
(45) Date of Patent: Sep. 27, 2022

(54) APPARATUS FOR EXPERIENCING A VIRTUAL REALITY SIMULATION IN AN UNDERWATER WORLD (71) Applicant: VR Coaster GmbH & Co. KG, Kaiserslautern (DE)

(72) Inventor: Miriam Corinna Wagner, Hochspeyer (DE)

(73) Assignee: VR COASTER GMBH & CO. KG, Kaiserslautern (DE)

( * ) Notice: Subject to any disclaimer, the term of this patent is extended or adjusted under 35 U.S.C. 154(b) by 0 days.

(21) Appl. No.: 16/761,362

(22) PCT Filed: Oct. 5, 2018

(86) PCT No.: PCT/EP2018/077210
§ 371 (c)(1),
(2) Date: May 4, 2020

(87) PCT Pub. No.: WO2019/091675
PCT Pub. Date: May 16, 2019

(65) Prior Publication Data
US 2020/0356161 A1 Nov. 12, 2020

(30) Foreign Application Priority Data
Nov. 13, 2017 (EP) .................................... 17201430

(51) Int. Cl.
*G06F 3/01* (2006.01)
*A63B 71/06* (2006.01)
(Continued)

(52) U.S. Cl.
CPC .......... *G06F 3/011* (2013.01); *A63B 71/0622* (2013.01); *A63G 31/007* (2013.01);
(Continued)

(58) Field of Classification Search
None
See application file for complete search history.

(56) References Cited

U.S. PATENT DOCUMENTS 5,219,315 A * 6/1993 Fuller ...................... A63G 3/00
  348/124
5,271,106 A * 12/1993 McClish .............. A63B 69/125
  352/89
(Continued)

FOREIGN PATENT DOCUMENTS

| EP | 3188482 A1 | 7/2017 |
| EP | 3213800 A1 | 9/2017 |
| JP | 2005007114 A | 1/2005 |

*Primary Examiner* — Jwalant Amin
(74) *Attorney, Agent, or Firm* — Nath, Goldberg & Meyer; Jerald L. Meyer; Morgan D. Rosenberg (57) ABSTRACT The invention relates to an apparatus (1) for at least one user (2) for experiencing a virtual reality simulation in an underwater world, comprising:
at least one water resource (10) with at least one flow generator (20),
at least one data processing system, and
at least one VR display device (40),
wherein the data processing system generates a virtual reality simulation,
wherein the at least one flow generator (20) is controlled by the data processing system as a function of the virtual reality simulation, and
wherein the virtual reality simulation is reproduced on the VR display device (40).

15 Claims, 3 Drawing Sheets

(51) Int. Cl.
*A63G 31/00* (2006.01)
*A63G 31/16* (2006.01)

(52) U.S. Cl.
CPC ...... *A63G 31/16* (2013.01); *A63B 2071/0638* (2013.01); *A63B 2071/0666* (2013.01); *A63B 2225/60* (2013.01)

(56) References Cited

U.S. PATENT DOCUMENTS

| | | | |
|---|---|---|---|
| 5,685,722 | A | 11/1997 | Taba |
| 2004/0086838 | A1* | 5/2004 | Dinis ..................... G09B 19/00 434/247 |
| 2014/0316192 | A1* | 10/2014 | de Zambotti ........ A61B 5/0205 600/28 |
| 2017/0060148 | A1* | 3/2017 | Jebran ....................... F17D 3/01 |
| 2017/0266529 | A1* | 9/2017 | Rekimoto ............. A63B 33/002 |
| 2019/0094540 | A1* | 3/2019 | Greenwood ....... G02B 27/0176 |
| 2020/0226946 | A1* | 7/2020 | Lysenko ................. G06F 3/016 |

* cited by examiner

APPARATUS FOR EXPERIENCING A VIRTUAL REALITY SIMULATION IN AN UNDERWATER WORLD

This is a National Phase Application filed under 35 U.S.C. 371 as a national stage of PCT/EP2018/077210, filed Oct. 5, 2018, an application claiming the benefit of European Application No. 17201430.0, filed Nov. 13, 2017, the content of each of which is hereby incorporated by reference in its entirety.

The present invention relates to an apparatus for a user for experiencing a virtual reality simulation, which makes it possible to experience a simulated augmented underwater world in a believable manner visually and sensorially.

Virtual reality simulations are known from the prior art in different designs and are used, for example, for reproducing a virtual reality during a roller coaster ride on a VR display device or a head mounted display to be worn by a rider. Here, by means of the head mounted display, the image of the optical reality is replaced by the stereoscopic representation of a virtual reality in the actual field of vision of the rider. Here, the representation of the virtual reality is synchronously adjusted to the head movement of the rider in real time as a function of the position and/or orientation of the head mounted display. In addition, the optical reality can be recorded by a camera and augmented in the representation of the head mounted display by bringing in augmented reality effects.

In these known fairground rides in which the rider wears a head mounted display during the ride and on which a virtual reality of the ride or roller coaster ride synchronized with the ride is displayed, the head mounted display is typically connected to a data processing system which generates the virtual reality simulation.

From the prior art, head mounted displays are already known, which are water-compatible and are used for underwater applications. Such virtual reality head mounted displays are used to represent a simulated underwater world for a user. A user swimming around freely in an underwater world, for example, in a pool, is always exposed to the associated risk of a collision between the user and the walls of the pool. The position of the virtual reality head mounted display would have to be determined continuously in order to make the position of such obstacles of optical reality visible in the virtual reality for the user and thus prevent a collision. Such a position determination under water is only possible under limited conditions due to the higher extinction. In addition, the freedom of movement in such a pool is often limited, and therefore, during the use of a position determination, a user can experience only a limited freedom of movement, whereby the simulated experience of an augmented underwater world is perceived to be unsatisfactory.

Therefore, the aim of the present invention is to provide an apparatus for a user for experiencing a simulated, augmented underwater world, which represents a virtual reality for the user by means of a VR display device, and at the same time, as a function of the virtual reality, the tactile perception of movements of the water, in particular by the sensation of a flow or the resistance of the water and by the illusion of unlimited freedom of movement, offers a particularly exciting experience. Here, to the extent possible, all the senses of the user should be stimulated in order to design the experience to be as true to life as possible in order to achieve the highest possible degree of immersion.

These aims are achieved by an apparatus having the features of claim 1. Advantageous developments are the subject matter of dependent claims.

The apparatus according to the invention for at least one user comprises at least one water resource with at least one flow generator which is configured to produce a relative movement in the water resource between the user and the water arranged in the water resource. In addition, the apparatus comprises at least one data processing system and at least one VR display device, wherein the data processing system generates a virtual reality simulation which is reproduced visually on the VR display device. The at least one flow generator can here either be controlled directly by the at least one data processing system as a function of the at least one virtual reality simulation or else it can generate flow synchronized with the at least one virtual reality simulation, whereby simulation-dependent relative movements between the water and the water resource and the at least one user are generated. As a result of the different relative movements, the at least one user perceives a movement in the water resource due to the resistance of the water, whereby the user can experience a particularly believable underwater world. The data processing system and the flow generator are here operated in such a manner that the virtual reality represented on the VR display device is coordinated with the relative movement in the water resource.

Here, it is particularly advantageous if the water resource is a pool, a lake, an ocean or a river. The apparatus according to the invention can thus be used in a multifaceted manner in any body of water provided that it is of sufficient size. Sufficient size always exists if the user has sufficient freedom of movement in all three directions of space. Particularly preferable are pools, in particular swimming pools.

According to an additional advantageous embodiment of the invention, it is provided that the flow generator is a pump, a turbine, a rope winch and/or a watercraft, in particular an underwater watercraft. The pump or water turbine is configured to locally generate one or more flows in the water resource, while a rope winch, a watercraft and/or an underwater watercraft pulls the user through the water resource. A combination of different flow generators is possible.

Moreover, it is advantageous if at least one input device is provided for the at least one user, which is connected to the data processing system. The user can have an influence on the virtual reality by means of the input device. The input device can comprise, for example, a key for starting and ending the virtual reality simulation or a twistgrip which is designed analogously to a twistgrip throttle control of a motorcycle and which changes the speed with which the user moves through the virtual reality world.

The input device can be connected by wire or wirelessly to the data processing system. Connections by wire are particularly preferable, since, due to the higher extinction of the electromagnetic waves in water, the range of wireless transmission is limited. However, wireless connections can be designed for short ranges, for example, as a Bluetooth or a Wlan connection.

According to an additional preferred embodiment of the present invention, at least one holding apparatus is provided in the water resource, by means of which the at least one user is held relative to the at least one flow generator. By means of the holding apparatus, the user is intended to remain stationary relative to the flow generator, so that there is no risk of the flow generator drifting away in an uncontrolled manner and hitting the edge of the pool.

The holding apparatus can be designed, for example, in the form of a shark protection cage which protects the user against predatory fish attacks represented in the VR world.

Another possible design of the holding apparatus is a replica of an underwater scooter. In corresponding grip positions of the underwater scooter, analogously to completely operational underwater scooters, the input devices can be provided, by means of which a particularly natural experience and an intuitive operation are enabled.

Moreover, the holding apparatus can be formed by a rod system and/or ropes by which the user is held.

However, it is also particularly advantageous if the holding apparatus comprises a movement device by means of which the holding apparatus can be moved. On the one hand, the movement device can be used, for example, for lifting the holding apparatus formed as shark protection cage along with the user into the water resource, and, on the other hand, the movement device or another movement device can generate shaking and movements on the holding apparatus. A collision with a predator fish simulated in the VR world can be rendered perceptible by means of a synchronous shaking of the shark protection cage by the movement device.

The movement device can preferably hold the holding apparatus in position by means of ropes. For entering and exiting, the ropes can be adjusted by the movement device in such a manner that the holding apparatus surfaces and from there the user can easily climb out of the water. Particularly preferably, such a movement device is used in connection with an underwater scooter. Predatory fish attacks, collisions and the like can also be simulated by means of the movement device and the underwater scooter as holding apparatus, and vibrations and movements can be experienced in a tactile manner by the user.

According to the invention, it is provided in addition that the holding apparatus comprises the at least one input device and/or the at least one flow generator. On the one hand, the holding apparatus can thus generate a flow which can be perceived by the user, and, on the other hand, the user can have an influence on the speed of the VR world by means of the holding apparatus. In the case of an integration of the flow generator in the holding apparatus, the distance between the user and the flow generator is reduced to the lowest possible distance. Thereby, the amount of the water mass flow moved by the flow generator is reduced, and, on the other hand, a change in the generated flow can be perceived within a slight delay by the user.

In addition, the holding apparatus can comprise a sensor system by means of which, for example, the flow resistance or the propulsion of the user can be acquired.

For example, the user can exert a force on the holding apparatus by generating his/her own propulsion. This propulsion force of the user is acquired, and the movement speed in the VR world and the flow generated by the flow generator are increased and vice versa. Thereby, the user can affect the speed through the VR world by swimming movements or diving movements. In addition, the sensor system can also acquire steering movements of the user on the holding apparatus and thus have an influence on the VR experience.

In addition, particularly preferably, the sensor system can acquire pressure or temperature in the flow. The sensor system can in particular acquire the flow speed and the flow direction, so that the virtual reality simulation can also be generated as a function of the flow generated by the flow generator.

Preferably, the VR display device is a water-compatible head mounted display. Moreover preferably, the head mounted display can acquire the position and/or the orientation synchronously with the head movement of the user. The head mounted display replaces the optical reality in the current field of vision of the user by a stereoscopic representation of a virtual reality. In an additional preferred embodiment of the VR display device, said VR display device is provided with at least one camera which acquires the virtual reality.

In addition, the head mounted display can comprise a camera by means of which the optical reality is recorded and augmented in the representation of the head mounted display by bringing in augmented reality effects.

The VR display device here can be connected by wire or wirelessly to the data processing system.

According to an additional preferred embodiment of the present invention, the flow generator comprises an admixing of warm and/or cold water. By the admixing of warm and cold water, different water layers can be simulated. Alternatively to the warm and/or cold water admixing, corresponding coolers/heaters can be provided.

Moreover, it is particularly advantageous if at least two flow generators are provided, which can generate a water flow in different flow directions and/or at different speeds. Thereby, in particular shear flows such as eddies or the like can be simulated.

Moreover, it is particularly advantageous if the at least one flow generator comprises a flow vector control, by means of which the direction vector of the flow relative to the user can be changed.

According to an additional preferred embodiment of the present invention, in the water resource, at least one sound source is arranged, which can reproduce sounds as a function of the virtual reality simulation. By means of the sound source, sounds from the VR world can be reproduced, such as, for example, passing motor boats, biting noises of predatory fish on the shark protection cage, or the like.

In an additional preferred embodiment of the present invention, at least one air bubble generator is provided, which is operated as a function of the virtual reality simulation. The air bubble generator generates one or more differently sized air bubbles which interact with the user in case of contact. The air bubbles locally alter the buoyancy of the human body, so that, in this manner, a perceptible force is exerted on the user by the air bubbles. The air bubbles can also contain heated or cooled air which generate a particular sensory experience.

Also preferably, at least one position acquisition device can be provided, by means of which the position of the at least one user is acquired. The position acquisition device can here acquire not only the position of the user but also, for example, the user's gestures and/or body posture. If several users are simultaneously using the apparatus, the users can interact with one another in the virtual reality and thus jointly explore the VR world and interact by means of gestures in the VR world as well.

An additional advantageous development of the present invention provides that a supply device is provided, by means of which an object can be supplied into the water resource. Such objects are, for example, swimming or diving goggles as well as balls, rubber fish or the like. The objects can be provided with a surface coating which has a surface feel matching the skin of a fish. The objects moreover can be represented in the VR world. The object(s) can also be impersonated by an operator who, for this purpose, puts on a diving suit with a corresponding surface feel.

Objects in the water resource can also be arranged so they can be moved by means of an actuator. The objects can be moved toward or in contact with the user in a manner controlled by the actuator and interact with the user physically or else in the VR world.

These objects can simulate water creatures, water plants or other underwater objects such as stones, rocks, wreckage, or replicas of real objects.

In addition, it is particularly advantageous if the data processing system contains a plurality of virtual reality simulations with different events. The user can in a targeted manner undergo an experience or several successive experiences, or, in a targeted manner via a user interface, certain preferences or dislikes can be taken into consideration in the design of the event.

Advantageously, multiple users of the apparatus can experience an individual virtual reality simulation.

The invention is described in detail below based on embodiment examples in reference to the appended figures. In the drawing:

Below, in reference to FIGS. 1 to 5, different exemplary embodiments of the invention are described in detail. Identical or functionally identical parts are designated with the same reference numerals.

Figure 1:
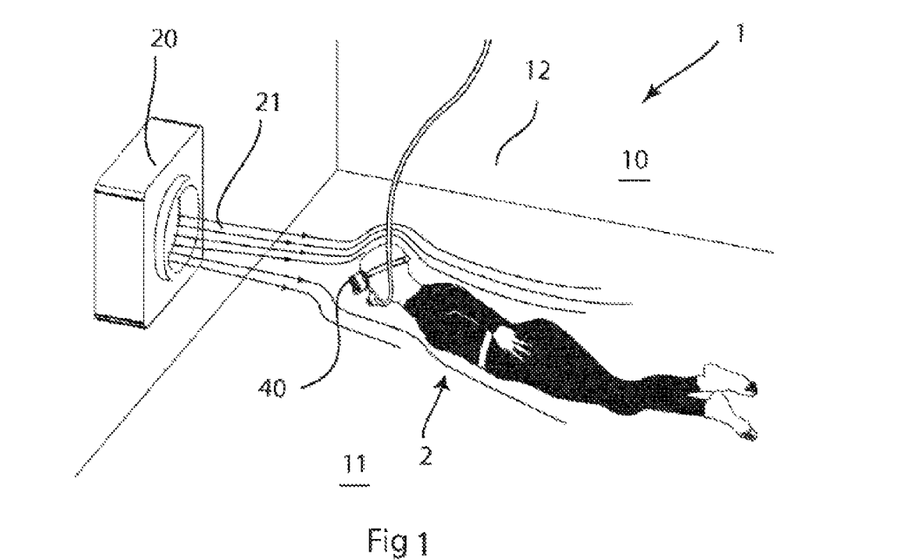
FIG. 1 shows a diagrammatic representation of an apparatus according to the invention, consisting of a flow generator which generates a flow in a water resource in which a user is located, who receives a VR world represented by means of a VR display device.

FIG. 1 shows, in a highly diagrammatic representation, an apparatus 1 according to the invention which enables a user 2 to experience a simulated augmented underwater world in a particularly believable manner.

The apparatus 1 comprises a data processing system (not represented) which computes or generates the virtual reality simulation using a computer program. This apparatus-specific computer program is used to simulate a virtual reality of an underwater world during a dive, wherein the virtual reality is represented for the user on a VR display device 40 and simulated so that it can be experienced in a in a particularly believable manner by additional technical means as explained in further detail below.

Furthermore, the apparatus 1 comprises a water resource 10 which is filled with water. In the present embodiment example, the water resource 10 is a pool 11 which is dimensioned to be of sufficient size so that the user 2 can freely move in all three directions in space without colliding with the walls 12 of the pool 11. The water in the water resource 10 is preferably fresh water, wherein salt water can also be used without problem.

On a wall 12 of the pool 11, a flow generator 20 configured to generate a flow 21 is arranged. The flow 21 flows in the form of a free jet through the water resource 10 and is configured to flow around the user. The flow generator 20 is formed analogously to a counter-current system, wherein the operating point is set by the data processing system as a function of the virtual reality simulation and thus can be varied dynamically. A corresponding pump or a water turbine for this purpose draws the necessary water from a water circuit or from a fresh water supply of the apparatus 1. Here, multiple flow generators 20 can be associated with a pump.

Alternatively, the flow generator 20 can generate predefined flow conditions using a program with a predetermined flow sequence. The flow sequence is started concurrently with the virtual reality simulation, and it is communicated to the application in the VR display device 40 that the animation should start. In this alternative embodiment, the virtual reality simulation generated by the data processing system is generated synchronously with the flow 21. By acquisition of flow parameters, the data processing system can also generate or synchronously generate the virtual reality simulation as a function of the flow generators 20.

The user 2 dives in the flow 21 of the flow generator 20 and attempts to make progress against the flow by propulsion movements. In order to prevent a collision with the walls 12, a position acquisition device is provided, which acquires the position of the user 2 in the water resource 10. The position acquisition device monitors the position of the user 2 in that the flow generator 20 is controlled position-dependently, whereby the user is held in a stationary position. If the user 2 generates more propulsion, he/she moves in the direction of the flow generator 20. The position acquisition device detects this and increases the flow speed of the flow 21, so that the user returns to the original position. Conversely, the situation is reversed when the user 2 generates a less propulsion.

The flow speed of the flow 21 in the water resource 10 here corresponds to the speed with which the user 2 moves through a virtual world or VR world generated by the virtual reality simulation. A scaling of the speeds can also be provided. The VR world can, for example, represent a dive through a reef.

The user 2 thus determines by his/her own movement course the speed with which he/she moves through the VR world. The user 2 can also have an influence on the VR experience by corresponding changes in the direction of movement.

During the dive, the user 2 is provided with oxygen for breathing by means of a suitable apparatus, wherein the tube for supplying breathing air can also be used for the data transmission from the VR display device 40.

In addition, the VR display device 40 can also easily be connected wirelessly to the data processing system, wherein, due to the higher extinction of the electromagnetic waves in water, wireless transmission is possible only over short distances. For the wireless transmission of the data between the data processing system and the VR display device 40, frequencies preferably having the longest wavelengths possible are used. Data transmission via common standard frequencies in ISM bands can also be used taking into consideration the above-mentioned limitations.

Due to the coupled interaction between the flow speed and the VR world represented by the VR display device 40, a particularly high degree of immersion is achieved. On the one hand, the user 2 receives a high-quality experience represented visually and simultaneously perceives the movement under water by feeling the flows, so that the user's consciousness is exposed to illusory stimuli which cause the real world to recede into the background, in such a way that it is now the VR world that is perceived as real.

Additionally, the experience of the user 2 can be augmented by further sensory stimulations and dramatic effects. In addition, objects 26 can be supplied to the flow 21, which are washed up against the user by the flow 21. In the VR world, these objects 26 can represent water creatures and make the VR experience even livelier. The objects 26 are preferably rubbery elastic solid bodies, in particular balls, the density of which is slightly lower than the density of water in the water resource 10. As a result, the objects 26 do not float directly in the flow 21, but instead they follow the flow, interact with the user and then only slowly float. The surfaces of the objects 26 in each case simulate animals represented in the VR world.

In addition, one or more sound sources can be arranged in the water resource 10, by means of which, for example, typical ocean sounds can be played back. By a corresponding arrangement of the sound sources, in connection with the visual representation by the VR display device 40, a motorboat passing by can be simulated.

In the water resource 10, air bubble generators can also be arranged, which expel in a targeted manner air bubbles that interact with the user 2.

Advancing into different layers of the water, in particular diving into deeper bodies of water can be simulated by admixing cold water. In the facial area and on the hand, the human body has a particularly large number of sensitive thermoreceptors capable of sensing even small temperature fluctuations. Thus slight temperature changes of approximately >0.25° C. are sufficient.

Figure 2:
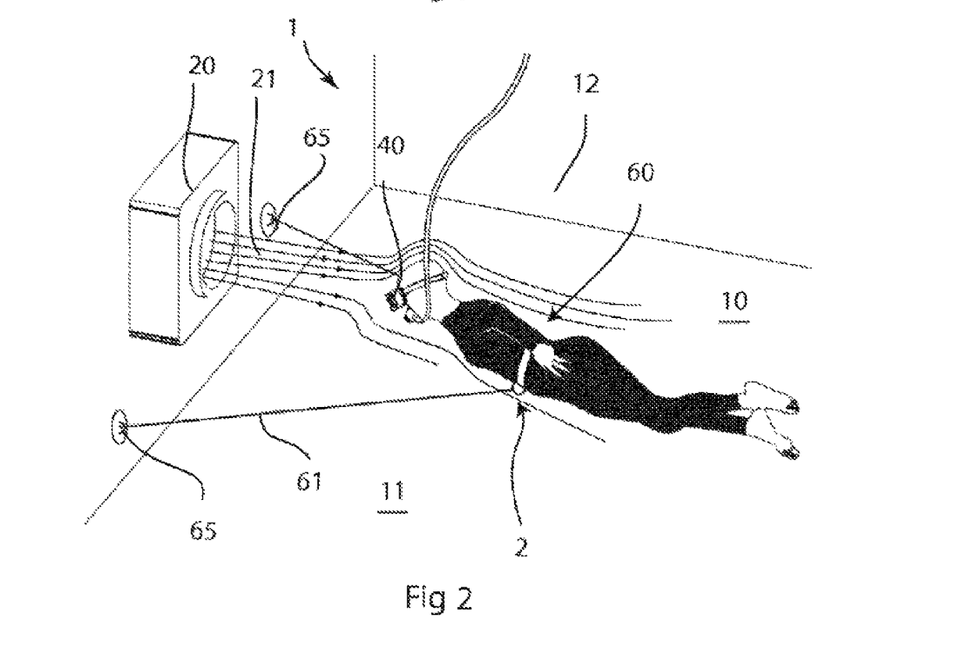
FIG. 2 shows a second embodiment example of the present invention, wherein the user is held stationary in a position with respect to the flow generator by a belt-like holding apparatus.

The second embodiment example according to the invention, represented in FIG. 2, differs in the type of positioning of the user 2 in front of the flow generator 20. The positioning of the user 2 is facilitated in that the user does not have to bring about the positioning in the flow 21 by his/her own body strength, but instead a holding apparatus 60 performs this task. The holding apparatus 60 holds the user 2 with a belt and holds him/her stationary by means of rope 61 in a predetermined position in front of the flow generator 20. The belt is preferably arranged in the hip area or the center of gravity of the body and keeps the user from drifting away. By means of the holding apparatus 60, a sustained flow experience can thus be enabled, without the user having to secure himself/herself to anything.

The holding apparatus 60 furthermore consists of a movement device 65, by means of which the user 2 can be moved relative to the flow generator 20. Such a movement is necessary, for example, at each beginning and at each end of the virtual experience, in order to move the user 2 from the pool edge into the corresponding position in front of the flow generator 20.

The data processing system controls the flow generator 20, the movement device 65 and generates the virtual reality simulation represented on the VR display device 40.

Figure 3:
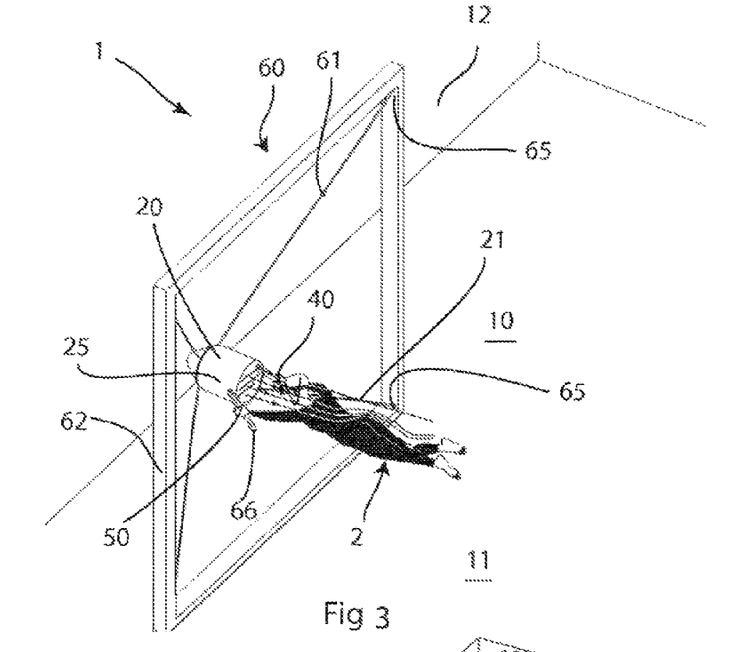
FIG. 3 shows a third embodiment example according to the invention with a holding apparatus which is designed as a diving scooter and comprises a flow generator.

A third embodiment example according to the invention can be obtained from FIG. 3, wherein identical or functionally identical parts are designated with the same reference numerals as in the preceding embodiment examples. The apparatus 1 contains for each user 2 a flow generator 20, a holding apparatus 60 or an underwater scooter 25 and a VR display device 40. The flow 21 can also be generated for all the users 2 by a common flow generator 20.

The holding apparatus 60 is modeled an underwater scooter 25 and is held by means of ropes 61 in a frame 62.

Analogously to the embodiment example presented in FIG. 2, the holding apparatus 60 comprises movement devices 65, wherein each of the ropes 61 can be fed with a movement toward the movement device 65.

The holding apparatus 60 or the underwater scooter 25 can be moved to the pool edge by the movement device 65 at the beginning of a ride and after completion of a ride, so that the user 2 can climb on or off. The holding apparatus 60 comprises two bracket-like grips 66 which the user 2 can hold onto and which protrude from the holding apparatus 60. On the grips 66, at least one input device 50 is provided, by means of which the user 2 can begin and end the ride or the experience.

In addition, on the grip 66, a second input device 50 is provided, which is formed as a twistgrip throttle control by means of which the user 2 can set the speed with which he/she floats through the VR world. The twistgrip throttle control here is based on a twistgrip throttle control on the steering handle of a motorcycle.

In the holding apparatus 60, a flow generator 20 is arranged. The flow generator 20 generates a flow 21 which comes out on the side of the holding apparatus 60 facing the user 2 and flows around the user 2. The holding apparatus 60 or the underwater scooter 25 is preferably designed as cylindrical or torpedo-shaped and the flow generator 20 is arranged in the interior of the holding apparatus 60. The current supply as well as the data connections to the data processing system can occur by wire along the ropes 61.

In addition, other flow generators 20 can be arranged in the water resource 10, so that, for the user 2, on the one hand, a diving speed, and, on the other hand, a wake of the underwater scooter 25 or of the flow generator 20 in the underwater scooter 25 can be perceived.

The holding apparatus 60 can also comprise a sensor system, by means of which the application of a force of the user 2 on the holding apparatus 60 is acquired. By means of the steering movements on the holding apparatus 60, the user 2 can influence the travel direction in the VR world. The sensor system acquires the steering movements of the user 2, whereby the corresponding changes in direction in the VR world occur.

The ropes 61 of the holding apparatus 60 can additionally ensure a current supply and/or data connection between the holding apparatus 60 or the underwater scooter 25, the flow generator 20, the sensor system and the VR display device 40 with the data processing system.

The sensor system can also metrologically acquire the flow 21 using appropriate measurement technology. Pressure/temperature sensors can be provided in order to acquire the flow 21, in particular flow speed and flow direction. By means of the measurement value(s) acquired by the sensor system, the virtual reality simulation can be generated by the data processing system as a function of the flow speed actually present.

The position acquisition device observes the user 2 during the experience. By means of the position acquisition device, for example, hectic movements or agitated behavior of the user 2 can be acquired. Hectic foot movements or hand movements can, for example, stir up sediments in the VR world, or scare water creatures.

Figure 4:
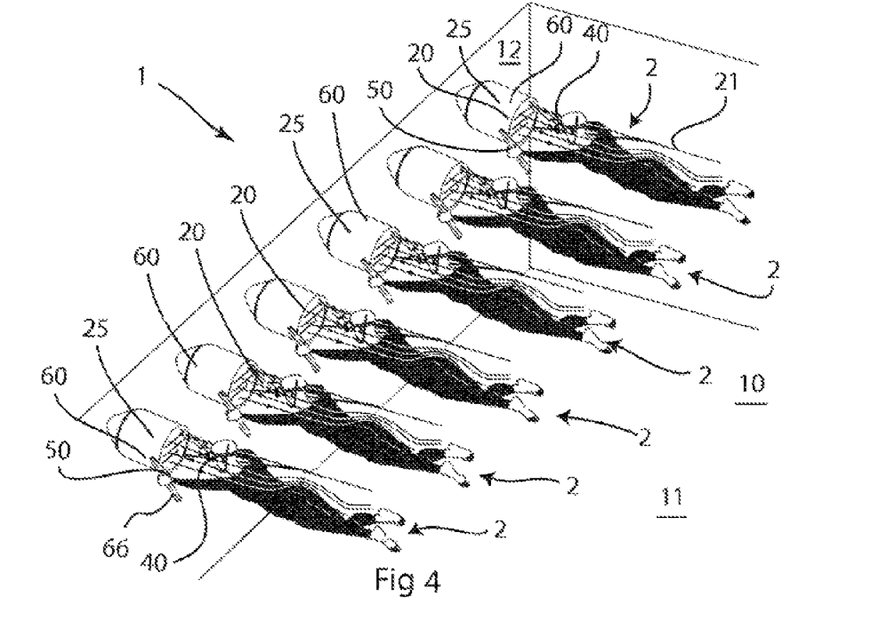
FIG. 4 shows a fourth embodiment example according to the invention of a device according to the invention with a plurality of flow generators and holding apparatuses which make a VR underwater experience possible for a plurality of users.

FIG. 4 shows the apparatus 1 with a plurality of holding apparatuses for multiple users 2. The holding apparatuses 60 are arranged firmly on the wall 12 of the pool 11 and are designed as an underwater scooter 25. Each of the users 2 has his/her own VR display device 40, wherein each user 2 can have an individual experience or the user 2 can have a shared experience in the VR world. A flow generator 20 is associated with each holding apparatus 60, so that each user 2 can also individually influence the experience in the VR world by corresponding inputs by means of the input device 50 or the sensor system.

The position acquisition device can here acquire each individual user 2 and represent him/her correspondingly in the VR world of the other users 2, so that, for example, communication by gestures between the individual users in the VR world is possible during the experience.

Figure 5:
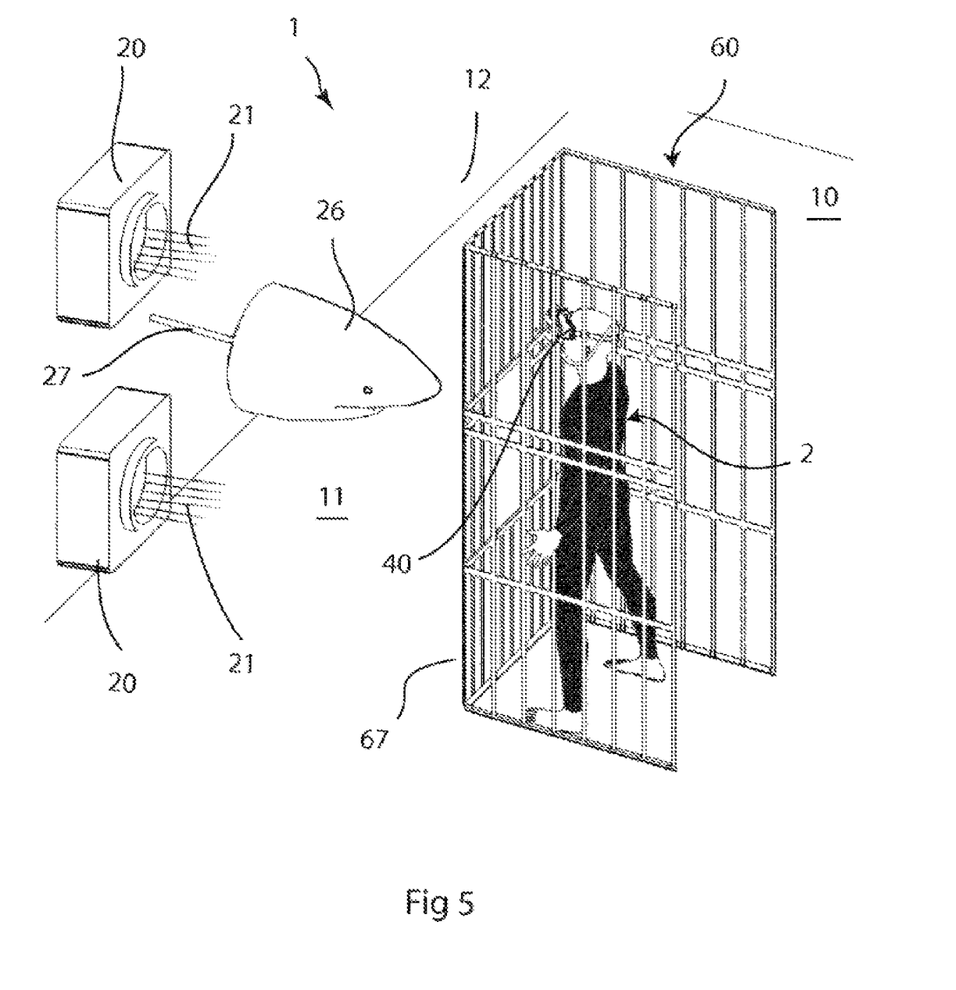
FIG. 5 shows a fifth embodiment example according to the invention with a holding apparatus formed as a shark protection cage, two flow generators and an object which can be moved by a movement device in the water resource and which can interact with the user.

FIG. 5 is a representation of a fifth embodiment example. The holding apparatus 60 is designed as a shark protection cage 67 in which the user 2 is located.

The device 1 according to this embodiment example enables a particularly exciting VR experience, namely cage diving with sharks. The apparatus 1 is here particularly compact and mobile and can be used at different sites, such as, for example, a mobile fairground ride.

This VR experience can start already before the actual immersion of the user in the water resource 10. The movement device 65 is designed, for example, as a crane which moves the shark protection cage 67 from a boat into the water resource 10 at a predefined position in front of the flow generator 20.

In the underwater world, a flow is simulated by the two flow generators 20. In addition, in the water resource 10, an object 26 is held in a movable manner by means of an actuator 27. The object 26 can be moved by the actuator 27 relative to the holding apparatus 60.

The movements of the object 26 are represented to the user 2 by the VR display device 40 in a manner corresponding to the virtual reality simulation generated by the data processing system in the VR world, during which the user 2 perceives the object 26 swimming past due to the different flow resistance. The object 26 can also collide with the holding apparatus 60 in a simulated manner, in order thus to simulate a shark attack. Synchronously, the movement device 65 can give the holding apparatus 60 a corresponding shaking and/or vibrating motion, and the sound source can generate corresponding sound effects. This haptic experience is represented visually in the VR display device 40 or in the VR world.

For the augmented simulation of, in particular, shear flows, flapping of fins of the marine animals, etc., the flow generators can have a vector control by means of which the flow vector can be set randomly. The occurrence in the VR application 40 can thus be simulated by individual or synchronized actuation of one or more flow generators 20.

The technical teaching according to the invention is not limited to the individual embodiments in the concrete embodiment examples. Instead, combinations of the individual embodiment examples are possible.

Thus, according to the invention, an apparatus 1 for experiencing a virtual reality simulation in an underwater world 1 can be provided, which in a multifaceted manner generates the largest possible number of sensory impressions, allowing the user 2 to have a believable simulated experience in the underwater world.

LIST OF REFERENCE NUMERALS

1 Apparatus
2 User
10 Water resource
11 Pool
12 Wall of 11
20 Flow generator
25 Underwater scooter
26 Object
27 Actuator
40 VR display device
50 Input device
60 Holding apparatus
61 Rope
62 Frame
65 Movement device
66 Grip
67 Shark protection cage

The invention claimed is:

1. An apparatus (1) for at least one user (2) for experiencing at least one virtual reality simulation in an underwater world, comprising:
   at least one water resource (10) with at least one flow generator (20);
   at least one data processing system;
   at least one VR display device (40);
   at least one holding apparatus (60) for holding the at least one user (2) in a position relative to the at least one flow generator (20); and
   at least one movement device (65) for moving the at least one holding apparatus (60) relative to the at least one flow generator (20) and the at least one water resource (10) under control of the at least one data processing system,
   wherein the at least one data processing system generates the at least one virtual reality simulation,
   wherein the at least one flow generator (20) and the at least one data processing system are synchronized for the virtual reality simulation to generate simulation-dependent relative movements between the at least one water resource (10) and the at least one user (2) to simulate movement of the at least one user (2) within the virtual reality simulation,
   wherein the virtual reality simulation is reproduced on the at least one VR display device (40), and
   wherein the at least one VR display device (40) is a water-compatible head-mounted display, and the at least one VR display device (40) is connected by wire or wirelessly to the at least one data processing system.

2. The apparatus (1) according to claim 1, wherein the water resource (10) is a pool (11), a lake, an ocean or a river.

3. The apparatus (1) according to claim 1, wherein the flow generator (20) is a pump, a turbine, a rope winch and/or a watercraft, in particular an underwater craft.

4. The apparatus (1) according to claim 1, wherein at least one input device (50) for the at least one user (2) is provided, which is connected to the data processing system, in that the reality simulation is controlled by the at least one input device (50), and in that the at least one input device (50) is connected by wire or wirelessly to the data processing system.

5. The apparatus (1) according to claim 4, wherein the holding apparatus (60) comprises the at least one input device (50), at least one sensor system, at least one vibration generator and/or the at least one flow generator (20).

6. The apparatus (1) according claim 1, wherein the flow generator (20) comprises an admixing of warm and/or cold water.

7. The apparatus (1) according to claim 1, wherein at least two flow generators (20) are provided, which can generate a water flow with different flow directions and speeds and/or in that at least one flow generator (20) comprises a flow vector control.

8. The apparatus (1) according to claim 1, wherein at least one sound source is arranged in the water resource (10), and wherein sounds are reproduced by the sound source as a function of the virtual reality simulation.

9. The apparatus (1) according to claim 1, wherein at least one air bubble generator is provided and in that the air bubble generator expels air bubbles as a function of the virtual reality simulation.

10. The apparatus (1) according to claim 1, wherein at least one position acquisition device is provided, which acquires the position of the at least one user (2).

11. The apparatus (1) according to claim 1, wherein at least one object (26) is arranged in the water resource (10) and/or in that at least one supply device is provided, by means of which at least one object (26) can be supplied into the water resource (10).

12. The apparatus (1) according to claim 11, wherein at least one actuator (27) is provided and in that the at least one actuator (27) moves the at least one object (26).

13. The apparatus (1) according to claim 11, wherein the at least one object (26) is part of the virtual reality simulation.

14. The apparatus (1) according to claim 1, wherein the data processing system generates a plurality of virtual reality simulations containing different experiences.

15. The apparatus according to claim 1, wherein, in case of a plurality of users (2), each user (2) can experience an individual virtual reality simulation.

\* \* \* \* \*